(12) United States Patent
Gurajada

(10) Patent No.: US 9,317,208 B2
(45) Date of Patent: Apr. 19, 2016

(54) DATA ROW CACHE FOR AN ACID COMPLIANT IN-MEMORY ROW STORE IN A PAGE-BASED RDBMS ENGINE

(71) Applicant: Aditya P. Gurajada, Hyderabad (IN)

(72) Inventor: Aditya P. Gurajada, Hyderabad (IN)

(73) Assignee: SYBASE, INC., Dublin, CA (US)

( * ) Notice: Subject to any disclaimer, the term of this patent is extended or adjusted under 35 U.S.C. 154(b) by 207 days.

(21) Appl. No.: 14/145,696

(22) Filed: Dec. 31, 2013

(65) Prior Publication Data

US 2015/0186051 A1 Jul. 2, 2015

(51) Int. Cl.
*G06F 3/06* (2006.01)

(52) U.S. Cl.
CPC ............ *G06F 3/0611* (2013.01); *G06F 3/0656* (2013.01); *G06F 3/0689* (2013.01)

(58) Field of Classification Search
CPC ..... G06F 3/0631; G06F 3/067; G06F 3/0646; G06F 3/0685; G06F 3/0688; G06F 3/068; G06F 3/0689; G06F 3/0611; G06F 3/0656
See application file for complete search history.

(56) References Cited

U.S. PATENT DOCUMENTS

| | | | | |
|---|---|---|---|---|
| 8,868,831 B2 * | 10/2014 | Goyal | ................ | G06F 12/0866 707/E17.12 |
| 2011/0055464 A1 * | 3/2011 | Moon | ................ | G06F 12/0246 711/103 |
| 2014/0143489 A1 * | 5/2014 | Asnaashari | ........... | G06F 3/0644 711/114 |

* cited by examiner

*Primary Examiner* — Hashem Farrokh
(74) *Attorney, Agent, or Firm* — Sterne, Kessler, Goldstein & Fox P.L.L.C.

(57) ABSTRACT

A system, method and a computer-readable medium for reducing a contentious access of data in memory system storage by simulating an online transaction processing business lifecycle, are provided. The memory storage system determines a type of data, where the type of data corresponds to access frequency of data. The data is stored in a row-based format in a row-based storage, a page-based format in a page-based storage and a compressed format in a compressed storage based on the determined type of data. The data is also transferred between the row-based storage, the page-based storage and the compressed storage according to predefined criteria.

21 Claims, 4 Drawing Sheets

DATA ROW CACHE FOR AN ACID COMPLIANT IN-MEMORY ROW STORE IN A PAGE-BASED RDBMS ENGINE

BACKGROUND

Conventional relational database systems employ page-based memory storage schemas both in cache and disk storage. The page-based memory storage includes multiple pages that store rows of related and unrelated data on the same page. When multiple clients attempt to access data frequently and concurrently from the cache memory storage, where some clients try to read the data while other clients concurrently try to update some other data, the server experiences contention. The contention occurs when unrelated clients attempt to read or modify different data items located in the same memory page where only one client is able to access one memory page at a time. This results in overall system latency and reduced performance because one client, which is attempting a read data from a row in a page, waits until another client that updates some other data row(s) in the same page completes accessing the memory page.

Therefore, what is needed are systems and methods for decreasing contention in a relational database when the database memory cache is accessed concurrently by multiple clients.

BRIEF DESCRIPTION OF THE DRAWINGS/FIGURES

The accompanying drawings, which are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
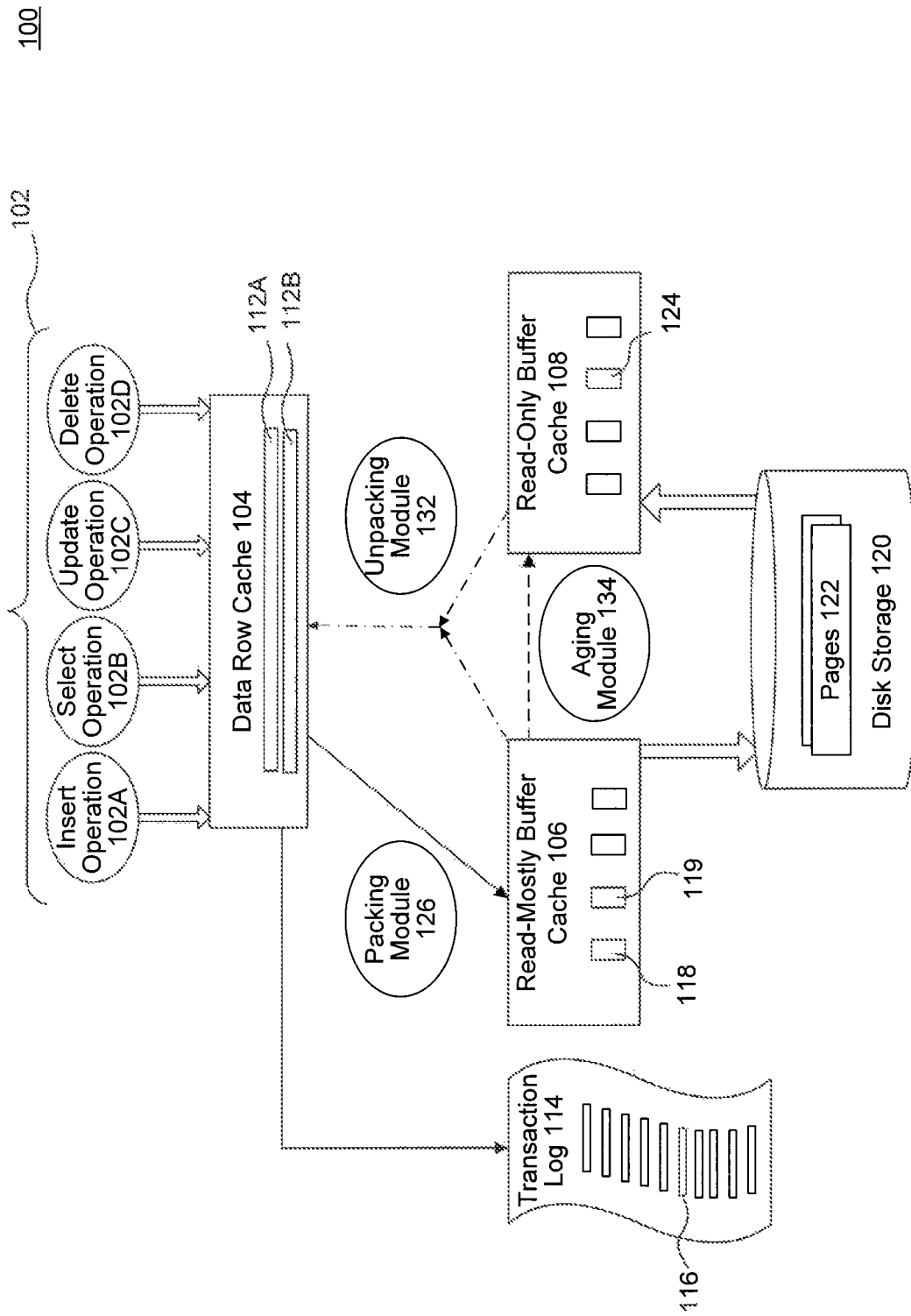
FIG. 1 is a block diagram of a memory storage system, according to an embodiment.

Online transaction processing (OLTP) refers to systems that facilitate and manage transaction-oriented clients. Those systems interact with a server that stores, retrieves, updates, and deletes data. In a business cycle, OLTP transactions tend to manipulate small sets of data stored in memory storage. When the OLTP data is inserted into the memory storage, there is a period of time when a client acts on that data. For example, the client may frequently access data by reporting-type operations (select operations), update operations or delete operations. Toward, and after, the end of the OLTP business cycle, the data is left largely unchanged and is accessed infrequently as compared to the frequency of access during the OLTP business cycle.

In an OLTP environment, the type of data that is accessed frequently is called active data or hot data. One characteristic of hot data can be that it was inserted into the memory storage during a recent period of time. The period of time that can be used to characterize hot data can be configurable and/or user-defined. For example, a system administrator may define that data that has been inserted into the memory storage in the most recent 72 hours as hot data. Another characteristic of hot data can be that it is frequently accessed and modified. For example, in a database, hot data may be frequently acted on using insert, update, delete, and select operations. The insert, update and delete operations access and manipulate data, whereas the select operations, read, but do not alter, the data. The frequency of accessing and/or modifying data to define which data is hot data can be configurable and/or user-defined. The phrase "access to the data" hereinafter refers to a set of operation types that include: Insert, Select, Update and Delete. This set of database operations are typically encountered in an OLTP business workload, and hereinafter are referred to as an ISUD workload.

After a period of time, (which varies based on the business scenario), hot data can become warm data. The period of time that can be used to characterize data as warm data can be configurable and/or user-defined. For example, a system administrator may define that data that has not been accessed or modified in that last two weeks as warm data. In another example, a system administrator may define that when an event occurs, the data that is associated with the event is changed from hot data to warm data. For example, when a ticket is purchased for a sporting event, the data pertaining to the ticket for the sporting event may be hot data. When the sporting event has occurred, the data pertaining to the ticket may be changed from hot data to warm data. Another characteristic of warm data can be that it is occasionally accessed or updated as compared to hot data. Another characteristic can be that the majority of operations that access the warm data are select operations. A configurable and/or user-defined threshold can be used to specify the number of operations that should be select operations in order to characterize data as warm data.

After another period of time, warm data become cold data. In an embodiment, cold data is infrequently accessed and rarely updated as compared to the warm data. Data that is mostly accessed using select operations can be characterized as cold data.

In an embodiment, the criteria for determining whether a type of data is hot, warm or cold is configured on a server and/or is based on the OLTP business requirements. Example criteria can be number of times the data was updated, modified or selected within a particular date or other data attributes.

For example, in an airline industry hot data can be a number of available seats on an airplane flight. When a passenger selects and purchases a plane ticket, the data associated with the ticket and the corresponding seat is inserted into the database and is hot data. The passenger may access the hot data (e.g., hot flight data) to select a meal plan, determine whether the flight time has changed and/or to check-in for the flight. Prior to the flight taking off, the passenger reservation data may be examined by business processes in the airline to, for example, plan and provision for the meals to be served on the flight, taking into account individual meal preferences of passengers. After the flight, the hot flight data can be changed to warm data (e.g., warm flight data). The flight data may be queried by a flight application to, for example, determine the number of people on the flight, and/or whether any passenger has made purchases on the flight. After a configurable time period, the warm flight data may become cold flight data. As described above, the cold flight data is queried by a client less frequently than warm data and can be stored in long term storage. For example, the cold flight data may be occasionally queried by an airline application for analysis to determine business parameters, such as pricing information, seating capacity, meal plan choices for future flights, frequent flier travel patterns etc.

FIG. 1 is a block diagram of a database storage system 100 that reflects the information lifecycle of transactional data, according to an embodiment.

Multiple clients may access the database storage system 100. Example clients include computing devices that may or may not be under a control of a user, such as, laptop computers, desktop computers, mobile communication devices, tablet computers, to name only a few. Clients may also include a plurality of standalone workstations, dumb terminals, or the like, that operate using a client operating system, such as a Microsoft® Windows client operating system (e.g., Microsoft® Windows 95/98, Windows 2000, Windows XP, Windows Vista, Windows 7 and Windows 8). Although FIG. 1 describes a database storage system, this description is by way of example, and not limitation, and the embodiments discussed here may be extended to other storage systems, known to a person skilled in the relevant art.

Clients transmit, receive and manipulate data stored in database storage system 100. In one embodiment, clients issue operations 102. Operations 102 can be queries. Queries are written in a query language, such as the Structured Query Language (SQL), which is a language allowing users and administrators to create, manipulate, and access data stored in the database management system (DBMS) that includes database storage system 100. Operations 102 may include select operations that are used to read the data. Operations may also include data manipulation language (DML) operations that are used to read and write data. Operations 102 may also include data definition language (DDL) operations used to describe data and maintain the database. In an embodiment, DML statements include an insert operation 102A, a select operation 102B, an update operation 102C and/or a delete operation 102D.

Clients may also include database applications that issue one or more SQL statements to a DBMS that hosts database storage system 100. Example database application may include stock trading systems, investment and financial assets tracking systems, airline ticketing systems, telephone call-tracking or telephone billing systems, etc.

SQL statements specify a query, such as a select query for retrieving data (i.e., data records meeting the query condition) from the database storage system 100. Select query is included in select operation 102B. In addition to retrieving the data, clients also have the ability to issue commands to insert new rows of data records into the table(s) in DBMS, or to update and/or delete existing records in the table(s). These commands are included in operations 102A, 102C and 102D, respectively. Business data usually begins the business life-cycle by being created, i.e., "inserted." Then business data is examined periodically, i.e., "selected." Subsequently, data in a business cycle might go through some number of modifications during its lifetime, i.e. "updated." If the data is no longer relevant or useful to the business, it might be purged from the memory storage system, i.e. "deleted." This sequence of events that may be embodied in SQL statements affecting the life-cycle of data in an OLTP system is henceforth referred to as ISUD (insert, select, update and delete) statements, or ISUD work load.

Clients may access hot data in database storage system 100. When accessing hot data," clients can access database memory storage system 100 using insert, select, update or delete operations 102A-D.

Clients can also access warm data or cold data. Clients can access warm data or cold data using select operation 102B to compile and analyze data. Warm data may be occasionally modified, but the frequency of such modifications tends to be far less than that for hot data.

In an embodiment, clients communicate with memory storage system 100 using a network. A network may be any one of a number of conventional network systems, including a Local Area Network (LAN) or Wide Area Network (WAN), as is known in the art (e.g., using Ethernet, IBM Token Ring, or the like). A network may also include functionality for packaging client calls in the SQL query language together with any parameter information into a format (of one or more packets) suitable for transmission to a server hosting database storage system 100.

In an embodiment, clients and database storage system 100 operate on a single computer or be embodied in a multi-user computer system, such as a client/server environment that communicates using network. In another embodiment, database storage system 100 may also be part of a DBMS. A DBMS generally operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat).

Database storage system 100 includes a data row cache 104 (also referred to as DRC 104), a read-mostly buffer cache 106, a read-only buffer cache 108 and disk storage 120. DRC 104, read-mostly buffer cache 106, and read-only buffer cache 108 are cache memories described in FIG. 4. Disk storage 120 is a hard disk storage also described in FIG. 4.

In an embodiment, DRC 104 is a high-performant memory storage that stores active data, also referred to as hot data. As discussed, data is hot or active when it is frequently accessed and/or modified by one or more clients. In an embodiment, database storage system 100 includes multiple DRCs 104, In a further embodiment, each of multiple DRCs 104 is dedicated to a table or a section of a particular table in database storage system 100. Typically, DRC 104 includes a section of a table that includes hot or active data that is accessed and/or modified frequently, while read-mostly buffer cache 106, read-only buffer cache 108 and disk storage 102 store other sections of the same table. In an embodiment, when entire table includes hot data, DRC 104 can store the entire table.

In an embodiment, DRC 104 is a row-based storage that stores data in rows 112 from one table in memory without binding the rows physically to any page-based on-disk storage. In a row-based storage like the DRC, as no database page-based storage is involved, multiple clients can access data in different rows 112A,B on the same page simultaneously without locking a page by a particular client. For example, when clients access data stored in DRC 104, database storage system 100 may lock row 112A that includes the accessed data during insert operation 102A, update operation 102C and delete operation 102D so that the data in the same row 112A is not manipulated by multiple clients. However, database storage system 100 allows multiple clients to access data in unrelated rows from a table (e.g., unrelated row 112B) within the same DRC 104. As a result, unrelated data stored in DRC 104 is not affected by the simultaneous access by multiple clients that would, in a page-based storage model, otherwise wait until a particular client completed accessing a page. An example of unrelated data is, and not limited to, the stock trade information for two different investors in a stock trading company who might buy, sell or track the stocks held in their individual portfolios. The trade investment details held by one investor are typically unrelated to those held or managed by another investor, but the data for both investors might be stored in the same DRC 104.

In an embodiment, DRC 104 is an extension of a page-based storage, such as read-mostly buffer cache 106, described below. However, rows in DRC are stored in-memory and are not stored as part of page-based storage. For example, DRC 104 stores rows 112A,B, from one table and the memory allocated to a DRC per table can be made configurable by the number of rows 112A,B per DRC or by the amount of memory allocated to DRC 104 for one table. However, whereas each page in read-mostly buffer cache 106 may be accessed by one client at a time, DRC 104 allows multiple client access to different rows 112A,B from the same table within a single DRC 104.

In an embodiment, the amount of memory that is allocated to DRC 104 is configured within database storage system 100. In this way, the amount of memory space in DRC 104 is extended and reduced as required by database storage system 100. In an embodiment, the amount of memory allocated to DRC 104 may be extended and reduced based on the amount of active data that is stored in DRC 104. As a result, when a table includes a lot of active data, the size of DRC 104 may be expanded. On the other hand, when a table includes a few active rows, the size of DRC 104 may be reduced.

In an embodiment, data in DRC 104 is stored in an uncompressed format. Instead, the data rows in DRC 104 are organized in a format efficient for access and manipulation by the query processing engine while processing the ISUD work load. The uncompressed format allows fast and efficient access to hot data in DRC 104 for different clients.

In an embodiment, data in rows 112A,B of DRC 104 are from one table. Each table in DRC 104 includes at least one column on which a primary index or a unique index is defined. Each table may also have secondary or non-unique indexes set on a column. A person skilled in the art will appreciate that indexes on one or more columns facilitate fast and efficient access to data.

In an embodiment, during an OLTP cycle, clients issue insert operations 102A, select operations 102B, update operations 102C and delete operations 102D. When database storage system 100 receives operations 102A-D on hot data, these operations are processed in DRC 104, without accessing the page-storage in the buffer caches 106, 108 or in the database's disk storage 120. For example, when a client issues insert operation 102A, data included in insert query 102A is stored in DRC 104. When a client issues a select operation 102B, database storage system 100 accesses data in the appropriate row (e.g., row 112A or row 112B) in DRC 104 and reads the accessed data. Similarly, when a client issues update operation 102C or delete operation 104D, data in the appropriate row (e.g., row 112A or row 112B) in DRC 104 is accessed and updated or deleted. Because the data in DRC 104 is stored in rows 112A,B, such that multiple rows 112A,B are accessible to multiple clients at the same time, multiple clients are able to access and manipulate unrelated data in DRC 104 without contention. For example, if data is being accessed and manipulated in row 112A by a client, other clients may access and manipulate data in the unrelated row 112B in the same DRC 104. This eliminates a contention issue common to conventional database systems when multiple applications attempt to access and modify unrelated hot data that is stored in the same page.

In an embodiment, database storage system 100 includes a transaction log 114. Transaction log 114 stores changes made to data in rows 112A,B in DRC 104. When data is inserted, updated, or deleted, changes to the data are stored in a transaction log 114. The data in transaction log 114 is stored as records 116. For example, if database storage system 100 is part of the DBMS, transaction log 114 stores the results of DML statements included in operations 102A, C, D. In another embodiment, records 116 include a delta of changes to data in DRC 104, where the delta is the difference between the old data and new data.

In an embodiment, transaction log 114 ensures that database storage system 100 can reinstate transactions that were committed to database storage system 100 but remains in DRC 104 when database storage system 100 crashes or malfunctions. Because DRC 104 is a cache memory that is maintained while a computing device is active, a crash may effectively wipe out the state of DRC 104. To recreate the memory state in DRC 104, database storage system 100 uses records 116 in transaction logs 114.

Read-mostly buffer cache 106 stores warm data. As discussed above, warm data is data that reaches a point in the OLTP business cycle, where the data is updated less frequently than hot data. This point in the OLTP business cycle may be determined by business-specific logic, such as when a number of accessed rows 112A,B falls below a particular threshold that is set within database storage system 100, the amount of time the data is stored in DRC 104, a particular event, etc., and can be configured within database storage system 100. When hot data becomes warm data, database storage system 100 transfers the hot data from DRC 104 to read-mostly buffer cache 106.

In an embodiment, read-mostly buffer cache 106 also stores a section of a table stored in DRC 104. However, read-mostly buffer cache 106 stores data in the table that is mostly read, as opposed to data that is updated by various clients and/or applications.

In an embodiment, read-mostly buffer cache 106 has memory space allocated in the same memory cache as DRC 104. However, data in read-mostly buffer cache 106 is stored in pages 118 that are enabled for page accesses and not for row access, unlike rows 112A,B in DRC 104. For example, when multiple clients access data stored in read-mostly buffer cache 106 using an insert operation 102A, update operation 102C, or delete operation 102D, database storage system 100 locks page 118 that includes a row that should be accessed during the corresponding operation (e.g., an insert operation 102A, update operation 102C, or delete operation 102D). The lock on page 118 can prevent other clients from accessing other rows in the page 118 during the insert operation 102A, update operation 102C, or delete operation 102D. In an embodiment, however, for read operations (e.g., select operations 102B), database storage system 100 allows multiple and simultaneous client access to the rows in page 118 during the read operations. In an embodiment, data rows in read-mostly buffer cache 106 may be stored in a compressed format in a page-structured layout. Data in compressed pages 119 is compressed for optimum storage rather than data accessibility.

To transfer the hot data from DRC 104 to read-mostly buffer cache 106, database storage system 100 moves the data rows, such as rows 112A,B, that are no longer hot in the DRC 104 to some pages 118 in read-mostly buffer cache 106.

In an embodiment, when database storage system 100 receives update operation 102C that accesses data in read-mostly buffer cache 106, memory storage system 100 identifies the row within page 118 and transfers the row from the read-mostly buffer cache 106 to DRC 104. To identify the row, database storage system 100 scans pages 118 in read-mostly buffer cache 106. To facilitate the scan, database storage system 100 can use one of indexes set on a column of the table in read-mostly buffer cache 106. Database storage system 100 then stores the identified data in a row 112A in DRC 104. In an embodiment, once database storage system 100 copies the data to a row 112A in DRC 104, database storage system 100 removes an index key that points to the row that stored the copied data in read-mostly buffer cache 106. In this way, database storage system 100 does not find the data in the copied row when it scans read-mostly buffer cache 106 during subsequent page scans.

In an embodiment, when database storage system 100 receives delete operation 102D that accesses data in read-mostly buffer cache 106, database storage system 100 scans rows within page 118 until it identifies the corresponding row for the data to be deleted. Once identified, database storage system 100 removes the index that points to the identified row in read-mostly buffer cache 106. In this way, database storage system 100 does not find the removed row in read-mostly buffer cache during subsequent page scans.

In an embodiment, when clients do not access data in pages 118 according to criteria specified by a business application, warm data can become cold data. Database storage system 100 can move the warm data from pages 118 to disk storage 120 that stores the cold data. In an embodiment, disk storage 120 is described in detail in FIG. 4.

In an embodiment, disk storage 120 also stores a section of a table that can be infrequently accessed by various clients and/or applications.

In the above described OLTP business cycle, cold data can include data that is rarely accessed by operations 102. When accessed, cold data is read using select operation 102B, rather than an updated operation 102C or deleted operation 102D. Because cold data is infrequently accessed, disk storage 120 may store pages 118 as compressed pages 122. Data in compressed pages 122 is compressed for optimum storage rather than data accessibility. To access data in compressed pages 122, memory storage system 100 first loads the compressed pages from disk to the read-only buffer cache 124. The data rows requested are decompressed before the data rows are returned to the DBMS for further processing. Because this process may be time and memory intensive, cold data is meant for infrequent access.

In an embodiment, database storage system 100 moves entire pages 118 of warm data from read-mostly buffer cache 106 to pages 122 in disk storage 120. For example, database storage system 100 may write out multiple pages containing data rows in a compressed format such as 119 and store them as compressed pages 122.

In an embodiment, database storage system 100 also includes a read-only buffer cache 108. Read-only buffer cache 108 is a page-based cache that stores data in pages 124. Data stored in pages 124 is also warm data. The warm data in pages 124 is data that database storage system 100 retrieves from disk storage 120.

In an embodiment, read-only buffer cache 108 also stores a section of a table. However, read-only buffer cache 108 stores data in the table that is read only, as opposed to updated by various clients and/or applications. The sections of a table that may be updated, are stored in DRC 104.

In an embodiment, database storage system 100 may retrieve compressed "cold data" in response to a client request for data stored in pages 122. Data stored in a compressed format on pages 122 is returned to the DBMS after de-compressing the compressed page and then de-compressing individual data rows.

Because in an OLTP business cycle operations 102 that access cold data can include select operations 102B, read-only buffer cache 108 can be designated for read-only access. If database storage system 100 receives update operation 102C or delete operation 102D, database storage system 100 may move data in pages 124 back to rows 112A,B in DRC 104, where update operation 102C or delete operation 102D act on the data.

In an embodiment, database storage system 100 includes a packing module 126, an unpacking module 132 and an aging module 134.

Packing module 126 transfers data from in DRC 104 to read-mostly buffer cache 106, as discussed above. For example, packing module 126 identifies rows 112A,B in DRC 104 that are no longer transactionally active or categorized as hot data and copies rows 112A,B from DRC 104 into pages 118 in read-mostly buffer cache 106. In an embodiment, packing module 126 moves rows 112A,B in bulk to pages 118 in read-mostly buffer cache 106. In an embodiment, packing module 126 can also compresses the rows packed from DRC 104 and moved to read-mostly buffer cache 106 for efficient page storage.

In an embodiment, when database storage system 100 determines that warm data in read-mostly buffer cache 106 becomes cold data, database storage system 100 transfers the warm data from pages 118, 119 in read-mostly buffer cache 106 to pages 122 in disk storage 120. This creates additional memory space in read-mostly buffer cache 106 for data that is stored in DRC 104 that has changed from the hot data to warm data.

In an embodiment, when database storage system 100 receives operation 102 that requests cold data, database storage system 100 retrieves cold data from disk storage 120 and stores the cold data as warm data in read-only buffer cache 108. To move cold data to warm data, the memory storage identifies page 122 that stores the requested data and moves page 122 to read-only buffer cache 108.

Once data is stored as warm data in read-only buffer cache 108, database storage system 100 may access page 124 and retrieve data for a client if the client requested select operation 102B. If individual tables are configured for compression, the data brought into read-only buffer cache 108 from disk storage 120 may be stored in a compressed format. Rows from such compressed pages are uncompressed to process the ISUD work loads once a client issues operations 102A, C and D.

When a client issues an operation such as update operation 102C or delete operation 102D that modifies or removes data in read-only buffer cache 108 or read-mostly buffer cache 106, database storage system 100 uses unpacking module 132 to transfer the warm data to DRC 104. To move the data, unpacking module 132 identifies the row in page 118 or page 124 that stores the data, and moves the row to DRC 104, where the data is stored as a row (e.g., row 112A, row 112B). In an embodiment, unpacking module 132 also decompresses the row before unpacking module 132 moves the row into DRC 104.

In an embodiment, database storage system 100 also includes an aging module 134. Aging module 134 may transfer data from read-mostly buffer cache 106 to read-only buffer cache 108 when the data remains as warm data but database storage system 100 receives select operation 102B from clients, rather than other types of operations 102. Aging module 134 enables a transfer of warm data from read-mostly buffer cache 106 to read-only buffer cache 108, directly, and not by way of disk storage 120.

Figure 2:
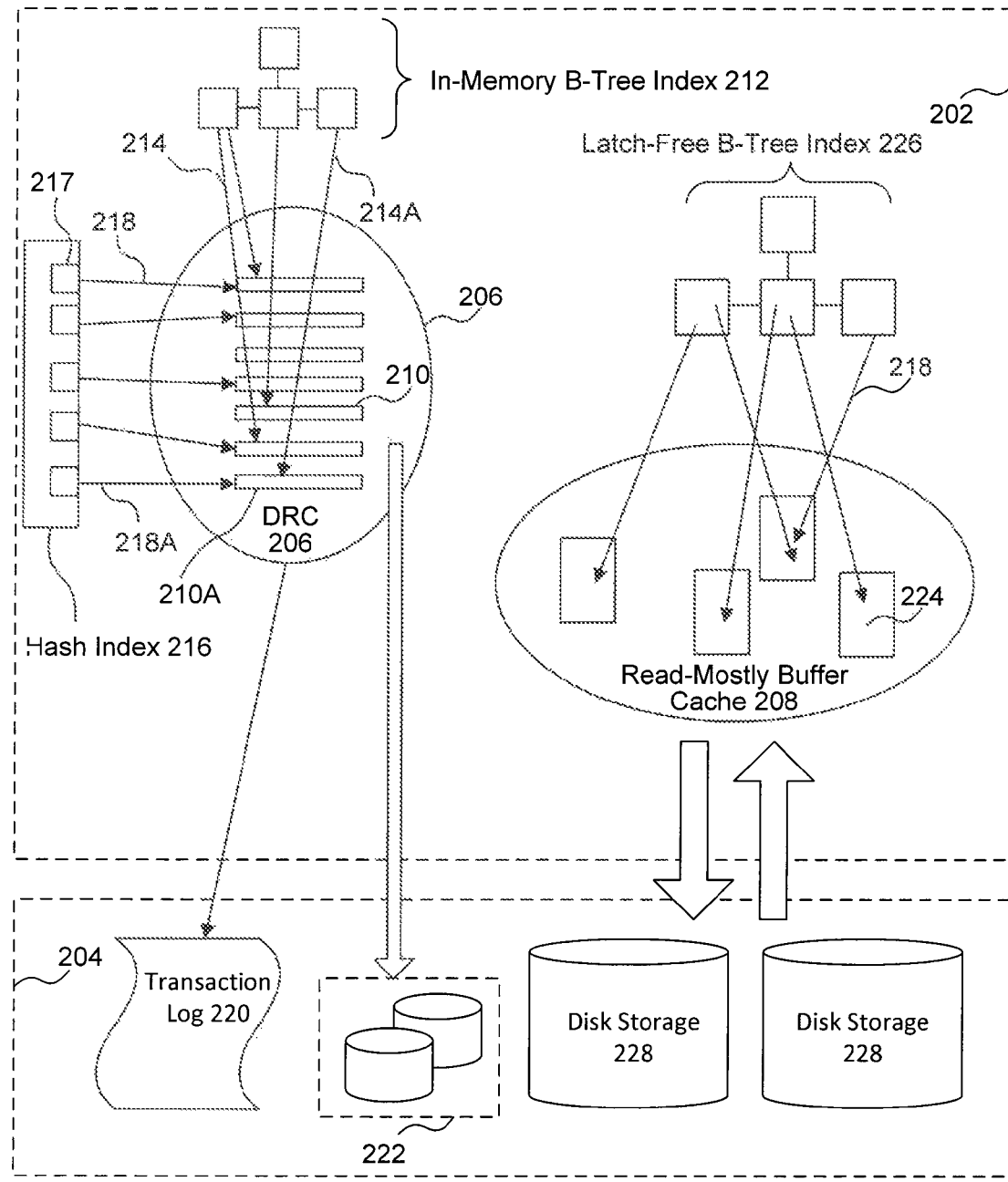
FIG. 2 is a block diagram of a memory storage system in a database management system, according to an embodiment.

FIG. 2 is a block diagram of database storage system 200 in a database management system, according to an embodiment. Database storage system 200 is a variation of database storage system 100 discussed in FIG. 1 incorporated into a database management system (DBMS).

A DBMS receives queries from multiple clients. These queries may include instructions that perform operations 102A-D on database storage system 200.

In DBMS, database storage system 200 is divided into cache memory 202 and disk memory 204. Both cache and disk memories are discussed in detail in FIG. 4.

Cache memory 202 stores DRC 104 and read-mostly buffer cache 106, renumbered as DRC 206 and read-mostly buffer cache 208. In an embodiment, read-only buffer cache 108 may also be included as part of read-mostly buffer cache 208, though the implementation is not limited to this embodiment.

DRC 206 stores rows 112, renumbered as rows 210. In one embodiment, to efficiently locate and access data in rows 210, database storage system 200 includes an in-memory b-tree index 212 built on rows 210 in DRC 206. In-memory b-tree index 212 is a tree data structure that stores an index on rows in the DRC 206, such as data row 210. In-memory b-tree index 212 may be built on one or multiple key columns and the index stores index rows 214 built out of these key columns that can be used to access the data rows in logarithmic time. Each key 214 in in-memory b-tree index 212 points to a particular row 210 in DRC 206. For example, key 214A points to row 210A.

In an embodiment, in-memory b-tree index 212 is an index that is fully stored in cache memory 202. The b-tree index 212 is not logged in a log and cannot be recovered. Instead, in-memory b-tree index 212 may be rebuilt along with rows 210 in an event of DBMS crash or failure, using the transaction log and DRC backing storage, described below.

In an embodiment, in-memory b-tree index 212 optimizes operations 102 that include requests for data having a specific range (also referred to as range queries). Range queries are operations 102 that retrieve records with values between some upper and lower boundary specified in the range query.

In an embodiment, to facilitate efficient access to data in rows 210, database storage system 200 includes a hash index 216. Hash index 216 is an index whose keys 218 are evenly distributed in hash buckets 217 using a hash function. Hash index 216 may be a lock-free index that provides efficient contention free access to multiple rows in DRC 104. Hash index 216 includes hash keys or keys 218, where each key 218 points to row 210 in DRC 206. For example, key 218A points to row 210 in DRC 206.

In an embodiment, hash-index 216 optimizes operations 102 that include requests for data having a specific value in DRC 206.

In an embodiment, a combination of b-tree index 212 and hash index 216 facilitate fast and efficient access to data stored in rows 210 of DRC 206.

Disk memory 204 in database storage system 200 stores transaction log 114, renamed as a transaction log 220. Transaction log 220 stores changes to data rows 210 in DRC 206 that are applied during operations 102A,C,D. Transaction log 220 is included in disk memory 204 such that transaction log 220 persists and the state of DRC 206 can be recreated in the event of DBMS crash.

In an embodiment, disk memory 204 includes a DRC backing storage 222. DRC backing storage 222 stores a backup of committed rows 210 in DRC 206. For example, at a certain point in time, that may be designated by a time stamp, database storage system 200 generates a data dump to DRC backing storage 222. In an embodiment, database storage system 200 is configured to generate a data dump to DRC backing storage 222 at configurable time intervals, where the data dump includes a state of DRC 206 at a time of the data dump. Together data in DRC backing storage 222 and transactions log 220 enables database storage system 200 to recreate the state in DRC 206 in the event of DBMS crash.

Together transaction log 220 and DRC backing storage also ensure that the DBMS maintains the ACID properties. ACID properties include "atomic", "consistency", "isolation", and "durability." The atomic property ensures that each transaction to insert, update, or delete data in the DBMS is an atomic transaction. A transaction is atomic when the transaction that includes multiple steps, is viewed as a single transaction by the DBMS after the transaction is committed. A transaction is committed when the changes are made permanent in DBMS and are visible to the clients. When a transaction is not committed or when one of the steps that make up a transaction fails, the state of data in the DBMS is rolled back to a point just prior to the transaction.

The consistency property ensures that data in all memory storages in a database is consistent. For example, the consistency property ensures that the committed data accessible to multiple clients is consistent irrespective of the memory component, such as, DRC 206, read-mostly buffer cache 208, disk storage 228, etc., that stores the data.

The isolation property ensures that multiple concurrent clients that operate on the data in database storage system 200 do not interact with each other. This ensures that page 224 in read-mostly buffer cache 208 may be read by multiple scans. However, the data stored in each page 224 in read-mostly buffer cache 208 may be modified using a single operation 102 at a time. This ensures that the data in the database storage system 200 is consistent and is not overwritten by simultaneous operations 102 from multiple clients.

The durability property ensures that the changes to the data that were committed are permanently stored in database system storage 200.

In an embodiment, read-mostly buffer cache 208 stores pages 118 that are renumbered as pages 224 in FIG. 2. In one embodiment, to facilitate efficient access to data in pages 224, database storage system 200 includes a latch-free b-tree index 226. Latch-free b-tree index 226 allows latch-free reads and updates to data in pages 224.

In an embodiment, disk storage 204 includes disk storage 228. Disk storage 228 may be disk storage 120 discussed in FIG. 1. When database storage system 200 determines that the warm data in pages 224 is not accessed by clients, database storage system 200 moves the warm data to disk storage 228 in disk storage 204 as cold data. Similarly, when database system 200 receives operation 102 for data stored in disk storage 228, database storage system 200 transfers the cold data back to pages 224 in read-only buffer cache 208.

In an embodiment, a read-only buffer cache 108 (not shown in FIG. 2) can include additional optimization mechanisms suited for read-only accesses. For example, because data in read-only buffer cache 108 is not updated, but read, read-only buffer cache 108 supports multiple select operations 102B from multiple clients that can occur simultaneously in a particular page. Additionally, read-only buffer cache 108 may not require latching which typically may be required for page-based storage that supports data updates.

In an embodiment, database storage system 200 can include multiple index structures that facilitate data accesses in DRC 206, read-mostly buffer cache 208, read-only buffer cache 108 (not shown in FIG. 2) and disk storage 228. In addition to the index structures discussed above, read-mostly buffer cache 208 may also include one or more just-in-time indexes (not shown). In a transactional system, multiple indexes may be defined on a table, but only one or a few main indexes are typically needed to enforce business rules in the form of unique indexes, primary key constraints etc. Many secondary indexes may be defined solely as efficient access methods for occasionally executed selects or reports. For the data rows in the DRC when the table is defined with several indexes, one or more of the secondary indexes may be defined as just-in-time indexes. Such indexes are not maintained immediately along with the inserts, updates or deletes to the rows in the DRC. Instead, when the occasionally run reporting applications or selects that may need such an index for efficient performance are executed, the index is first updated in a delayed manner and then used as an access method. In one embodiment, the just-in-time index may be rebuilt before commencing the execution of the select or reporting application which needs this index as an access method. In-memory b-tree indexes, on rows in the DRC, that are maintained just-in-time when to execute occasionally run selects or reporting applications allow for enhanced performance for the ISUD work load operating on the rows in the DRC during the OLTP business cycles.

Figure 3:
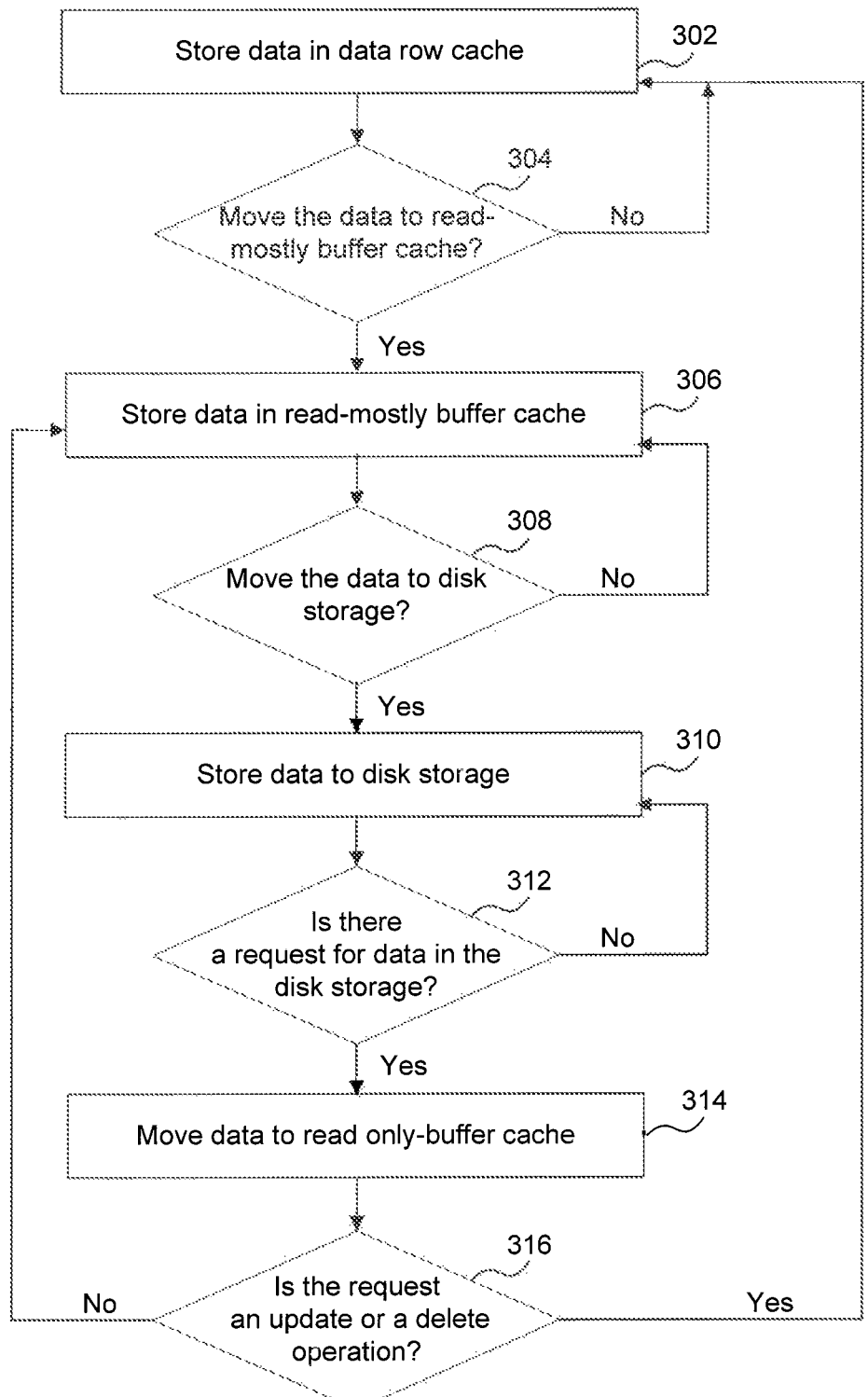
FIG. 3 is a flowchart of a method of data in a memory storage system flowing through an online transaction processing business cycle, according to an embodiment.

FIG. 3 is a flowchart of a method 300 of data in a memory storage system flowing through an online transaction processing business cycle, according to an embodiment. The steps in method 300 may be performed using the components discussed in FIG. 4.

At step 302, data is stored in a data row cache. For example, data transmitted to database storage system 200 via one of operations 102 is stored in DRC 206. As discussed above, DRC 206 is a row-based in-memory storage that enables multiple clients simultaneous access to multiple rows 210 for a table within DRC 206. Data remains in DRC 206 as long as data is hot data that is actively accessed by operations 102A-D.

At step 304, a determination is made whether to move data to a read-mostly buffer cache. For example, hot data becomes warm data when the data becomes less active, is accessed less frequently or has reached a threshold specified by business logic of a particular application. As discussed above, the determination can be made periodically, or based on the frequency accesses of the hot data in DRC 206. Once hot data becomes warm data, the data in rows 210 in DRC 206 are moved to pages 224 in read-mostly buffer cache 208 and the flowchart proceeds to step 306. Otherwise, the flowchart proceeds to step 302.

At step 306, the data is stored in a read-mostly buffer cache. For example, database storage system 200 bunches up data in rows 210 that have reached the threshold in step 304, and copies the data to pages 224 in read-mostly buffer cache 208. At completion of step 306, data is stored in read-mostly buffer cache 208 as "warm data."

At step 308, a determination is made whether to move data to disk storage. For example, warm data becomes cold data when the read access for the data in pages 224 becomes infrequent or is below a threshold specified by business logic of a particular application. As discussed above, the determination may be made periodically or based on a threshold, as specified by business logic. Once warm data becomes cold data, the flowchart proceeds to operation 310. Otherwise, the flowchart proceeds to step 306.

At step 310, the data is stored in the disk storage. For example, database storage system 200 compresses data in pages 224 determined in step 308 and moves the data to disk storage 228. At completion of step 310 the data is stored in disk storage 228 as cold data.

At step 312, a determination is made whether there is a request for cold data that is stored in the disk storage. For example, database storage system 200 may receive a client request for data that is stored as cold data in disk storage 228. If the request is received, the flowchart proceeds to step 314. Otherwise, to step 310.

At step 314, the cold data is moved to read-only buffer cache 108. For example, database storage system 200 moves the requested data to read-only buffer cache 108. At this point, the cold data is again warm data.

At step 316, a determination is made whether the request in step 312 is an update request or a delete request. If the request is an update request or delete request, the flowchart proceeds to step 302. Otherwise, to step 306.

As discussed above, flowchart 300 represents an OLTP business life cycle of data as it is stored in database storage system 200. The OLTP business life cycle of data as described in flowchart 300 continues as long as clients continue storing and accessing data in database storage system 200.

Figure 4:
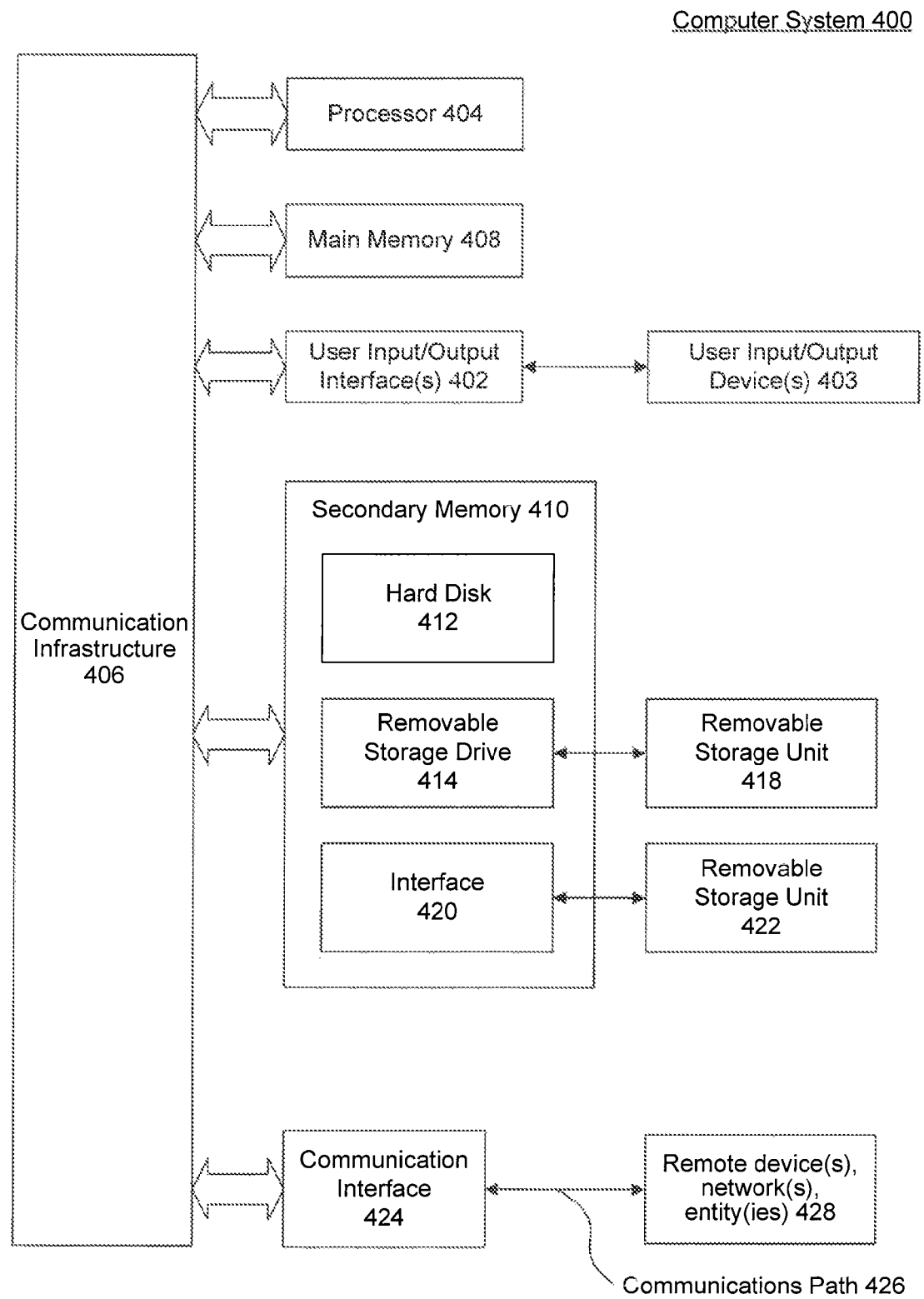
FIG. 4 is a block diagram of an exemplary computer system where the embodiments can be implemented.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as processor 404. Processor 404 is connected to a communication infrastructure or bus 406.

One or more processors 404 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the embodiments or the appended claims in any way.

While the embodiments have been described herein with reference to exemplary embodiments for exemplary fields and applications, it should be understood that the embodiments are not limiting. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the embodiments should not be limited by any of the above-described exemplary embodiments, but should be defined only in accordance with the following claims and their equivalents.

What is claimed is:

1. An integrated relational database management system (RDBMS), comprising:
   a data row cache comprising rows that store a first type of data of a table in a row-based format, wherein the data row cache is configured to allow access to the rows to a plurality of clients at the same time;
   a buffer cache comprising a plurality of pages that store a second type of data of the table in a page-based format, wherein the buffer cache is configured to allow access to a page in the plurality of pages to one client from the plurality of clients at a time;
   a disk storage that stores a third type of data of the table in a compressed page-based format, wherein the third type of data in the disk storage is moved to the buffer cache before any client of the plurality of clients accesses the third type of data; and
   a processor coupled to the data row cache, the buffer cache, and the disk storage, and configured to:
      determine a type of data as the first type of data, the second type of data or the third type of data, wherein the determined type of data corresponds to access frequency of data; and
      store the data in the data row cache, the buffer cache, or the disk storage based on the determined type of data.

2. The RDBMS of claim 1, wherein:
   the first type of data in the data row cache is transactional data that is initially inserted into the RDBMS;
   the second type of data in the buffer cache is accessed less frequently than the first type of data in the data row cache; and
   the third type of data in the disk storage is accessed less frequently than the second type of data in the buffer cache.

3. The RDBMS of claim 1, wherein the data row cache is an in-memory cache configured for concurrent access of the first type of data in the table by the plurality of clients that request the processor to perform an insert operation, a select operation, an update operation, or a delete operation on the first type of data.

4. The RDBMS of claim 1, wherein the buffer cache is limited to process a select operation on the second type of data.

5. The RDBMS of claim 1, wherein the data row cache, the buffer cache and the disk storage are included within a single integrated RDBMS.

6. The RDBMS of claim 1, wherein the processor is further configured to:
   determine a change in the type of data based on the access frequency of the data; and transfer at least one of the first type of data, the second type of data, or the third type of data between at least one of the data row cache, the buffer cache or the disk storage based on the change in the type of data, wherein the transfer of the at least one type of data is transparent to the plurality of clients.

7. The RDBMS of claim 6, wherein to determine the change in the type of data the processor is further configured to:
   determine that the access frequency of the first type of data meets first criteria;
   based on the determination, pack the first type of data from the row-based format in the data row cache into a page-based format of the buffer cache;
   transfer the packed data to the buffer cache; and
   store the packed data in the buffer cache, wherein the transfer of the packed data is transparent to the plurality of clients.

8. The RDBMS of claim 6, wherein to determine the change in the type of data the processor is further configured to:
   determine that the access frequency of the second type of data meets second criteria;
   based on the determination, compress the second type of data from the page-based format into the compressed page-based format; and
   transfer the second type of data to the disk storage, wherein the second type of data becomes the third type of data after the transfer and the transfer of the compressed data is transparent to the plurality of clients.

9. The RDBMS of claim 1, wherein the processor is further configured to:
   receive an update request;
   in response to receiving the update request, identify a row in one of the plurality of pages in the buffer cache that stores data in the table requiring an update;
   transfer the data to a row in the data row cache; and
   update the data in the data row cache according to the update request.

10. The RDBMS of claim 1, wherein the data row cache further uses a hash index that accesses a row in the data row cache and a b-tree index that accesses a range of rows in the data row cache, wherein a combination of the hash index and the b-tree index facilitates efficient access to the first type of data in the data row cache.

11. The RDBMS of claim 1, wherein the buffer cache uses a b-tree index to access the data in the page of the buffer cache, wherein the b-tree index facilitates efficient access to the second type of data in the buffer cache.

12. The RDBMS of claim 1, wherein the processor is further configured to:
   divide the table into a first section, a second section and a third section, wherein the data row cache stores the first section of the table, the buffer cache stores the second section of the table, and the disk storage stores the third section of the table and wherein the first section, the second section and the third section reflect different access patterns for the data in the table.

13. The RDBMS of claim 1, wherein the processor is further configured to:
   determine access pattern for the data stored in a section of the table; and
   move the data in the section of the table between the data row cache, the buffer cache or the disk storage based on the access pattern of the data, wherein the movement of data is seamless to the plurality of clients.

14. The RDBMS of claim 1, wherein the access frequency of the first type of data, the second type of data, and the third type of data corresponds to a life cycle of the data.

15. A method, comprising:
   determining a type of data as a first type of data, a second type of data or a third type of data, wherein the determined type of data corresponds to access frequency of data; and
   wherein based on the determined type of data:
   storing the first type of data of a table in a row-based format in a data row cache, wherein the data row cache allows a plurality of clients to access the data in different rows at the same time;
   storing the second type of data of the table in a page-based format in a buffer cache, wherein the buffer cache allows access to a page in the plurality of pages to one client of the plurality of clients at a time; or
   storing the third type of data of the table in a compressed page-based format in a disk storage, wherein the third type of data in the disk storage is moved to the buffer cache before any client of the plurality of clients can access the third type of data, and
   wherein the data row cache, the buffer cache, and the disk storage are components of a single integrated relational database management system (RDBMS).

16. The method of claim 15, wherein the data row cache further comprises a hash index that accesses a row in the data row cache and a b-tree index that accesses a range of rows in the data row cache, wherein a combination of the hash index and the b-tree index facilitates efficient access to the first type of data in the data row cache.

17. The method of claim 15, further comprising:
   determining a change in the type of data based on the access frequency of the data; and
   transferring the data between at least one of the data row cache, the buffer cache and the disk storage based on the change in the type of data, wherein the transfer of the at least one type of data is transparent to the plurality of clients.

18. The method of claim 15, wherein determining the change in the type of data further comprises:
   dividing the table into a first section, a second section and a third section, wherein the data row cache stores the first section of the table, the buffer cache stores the second section of the table, and the disk storage stores the third section of the table, and wherein the first section, the second section and the third section reflect different access patterns for the data in the table.

19. An integrated relational database management system (RDBMS) comprising:
   a plurality of storage devices that store a section of a table in the RDBMS, wherein each storage device stores data in the table that is associated with a different access pattern and allows simultaneous data access by one or more clients; and
   a processor configured to move the data in the table between the plurality of storage devices based on a change in the access pattern of the data.

20. The integrated RDBMS of claim 19, wherein the processor is further configured to:
   determine a storage device from the plurality of storage devices that stores a first subset of data requested by a first client; and
   based on a type of the determined storage device, retrieve the subset of data from the storage device either sequentially or concurrently with a second client that issues an access request for a second subset of data in the same table and the same storage device, wherein the sequential or concurrent access is transparent to the first client and the second client.

21. The integrated RDBMS of claim 19, wherein the data in the table in the RDBMS is stored in a row format in an in-memory storage, a page format in a cache storage and a compressed format in a disk storage of the plurality of storage devices.

\* \* \* \* \*